July 9, 1968  R. KOCH  3,392,102

GALVANIC ACTION WATER PURIFIER

Filed March 16, 1967

Inventor
Rudolf Koch
By Cyril M. Hajewski
Attorney 3,392,102
GALVANIC ACTION WATER PURIFIER
Rudolf Koch, 1948 N. 26th St.,
Milwaukee, Wis. 53205
Filed Mar. 16, 1967, Ser. No. 623,677
2 Claims. (Cl. 204—249)

ABSTRACT OF THE DISCLOSURE

An apparatus for purifying water in which a water passage is filled with granular particles of electro-positive and negative elements intermixed with each other to constitute negative and positive poles that form a multitude of small batteries. Polluted water introduced into the passage serves as an electrolyte to activate the batteries for generating an electric current. Such electric current produces a purifying action on the water.

Background of the invention

Figure 1:
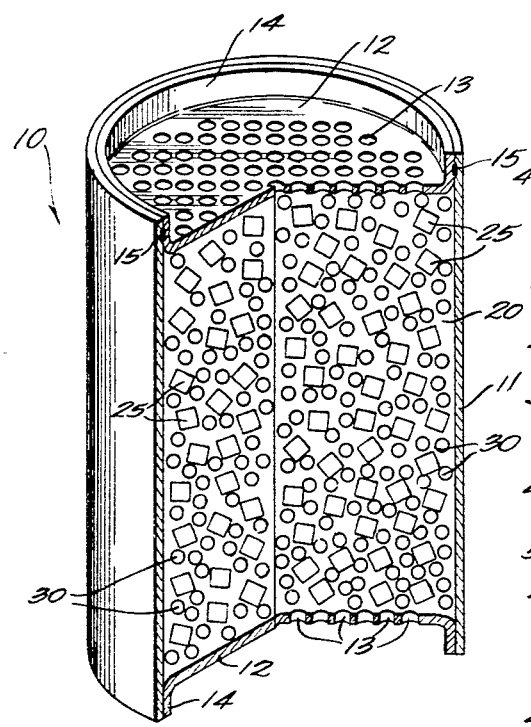

The present invention relates to apparatus for purifying polluted water to render it fit for human consumption. The purifying apparatus produces an electric current that passes through the polluted water for sterilizing the water at the prevailing temperature.

It has been previously recognized that a germicidal action may be produced by passing an electric current through polluted water for rendering the water fit for human consumption. In Patent Number 470,181 issued to Collins on Mar. 8, 1892, a separate source of direct current in the form of a battery is provided and a series of anodes and cathodes are connected to the respective poles of the battery and immersed in the liquid that is to be purified. The current passes through the liquid between the several electrodes for effecting the sterilization of the water.

Subsequent to the above mentioned Collins patent it was discovered that the same germicidal action could be obtained without the requirement of an independent source of electrical energy by passing the polluted water through an environment wherein the water serves as an electrolyte for a galvanic battery. In this arrangement, the polluted water is directed into a passage or enclosure wherein it comes into simultaneous contact with two dissimilar materials that serve as the respective positive and negative poles of the battery. When the polluted water is introduced into such an environment it acts as the electrolyte for the galvanic battery to generate an electric current which produces the germicidal action on the polluted water to sterilize it at the prevailing temperature and without the addition of any chemicals to the liquid. Such galvanic battery arrangement is disclosed in Patent Number 866,618 issued to Brannon on Sept. 24, 1907.

Summary of the invention

The present invention is an improvement over the prior galvanic cell type of water purifier. In the prior art structures the two poles of the cell are constructed in the conventional manner of a galvanic battery wherein two distinct poles are provided. Each pole is a solid mass of convenient configuration and they are separated from each other with the water being in contact with both of them to produce the electric current.

The structure of the present invention provides a galvanic battery type of water purified of greatly improved germicidal action by reducing either one or both of the dissimilar materials to particles or grains and intermixing the granulated materials in the passage through which the water flows. As a result, the purified includes a multitude of negative and positive poles and when the polluted water contacts these granules it serves as an electrolyte to cooperate with them for forming a multitude of galvanic cells that cooperate for producing the improved germicidal action. One of the factors contributing to the superior efficiency of this structure, is the much greater surface exposure and utilization of the negative and positive elements that is obtained in the same amount of space. When the water passes through these particles of dissimilar materials it is in contact with a maximum surface area of the positive and negative elements at any one time in the given space to produce the more efficient galvanic action and a correspondingly more efficient germicidal action.

The intermixing of the granules of two dissimilar materials places the poles in proximity to each other to produce a maximum voltage gradient for the given conditions, and this in combination with the maximum area of surface exposure releases the greatest amount of nascent oxygen and chlorine which combine to destroy harmful bacteria in the water. Moreover, the granular intermixed arrangement of the poles immersed in the polluted water produces an even distribution of the electric current through the water in the purifying chamber so that the maximum purifying effect is applied to all of the water passing through the purifier.

Although the concept of the present invention may be employed in a variety of different types of water purifiers it is especially well adapted for use in portable water purifiers that are carried out into the field. Such a water purifier can be of a compact design for portability and will operate efficiently to purify water fit for human consumption at a relatively rapid rate.

Drawing description

Figure 2:
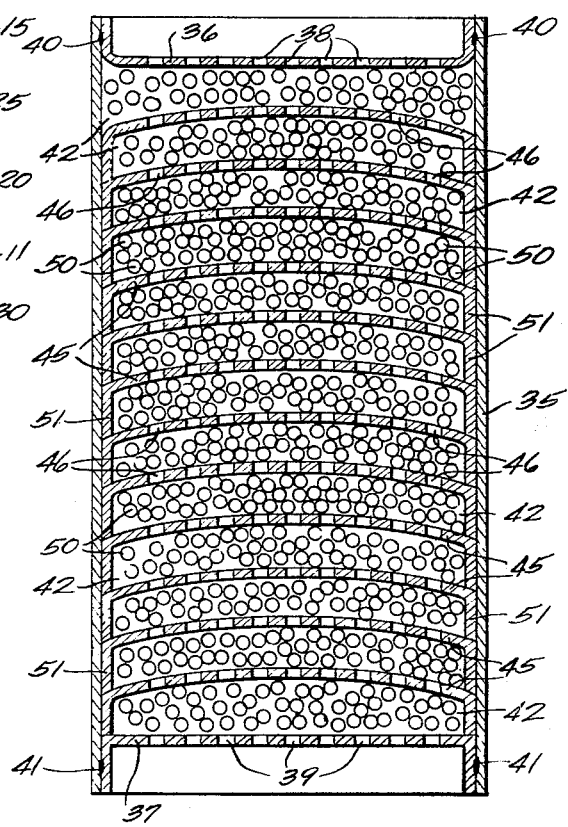

The foregoing and other objects of this invention, which will become more fully apparent from the following detailed description of an embodiment thereof may be achieved by the apparatus herein described by way of example in connection with the illustration of its structural components in the accompanying drawings, in which:

FIGURE 1 is a perspective view of a water purifier incorporating the features of the present invention with a portion of the structure being cut away to illustrate the purifying material which is illustrated diagrammatically for the sake of clarity; and FIGURE 2 is a view in vertical section through an alternate embodiment of the invention with the granular material contained in the structure being illustrated diagrammatically.

Description of the preferred embodiments

Reference is now made more particularly to the drawings and specifically to FIG. 1 thereof which illustrates a water purifier constructed in accordance with the teachings of the present invention. The purifier there illustrated comprises a container generally identified by the reference numeral 10 and which is filled with a granular material that will be subsequently described. The container 10 comprises a cylinder 11 that forms a passage for the water that is being purified. The cylinder 11 is provided with a perforated top end piece 12 having a plurality of perforations or apertures 13 through which water may be admitted into the interior of the cylinder 11.

The end piece 12 is illustrated as having an outwardly extending annular flange 14 that is disposed so that its outer edge is flush with the upper edge of the cylinder 11. The flange 14 is illustrated as being attached to the cylinder 11 by spot welds 15 although it is to be understood that other forms of attaching the end piece 12 to the cylinder 11 may be utilized. The outwardly extending flange 14 is convenient inasmuch as it cooperates with the end piece 12 to form a receptacle for receiving the water that is to be purified for admission through the perforations 13 into the interior of the cylinder 11 for purification.

The lower end of the cylinder 11 is likewise provided with an end piece 12 with its perforations 13 for retaining the granular material within the cylinder 11 while permitting the water to flow out of the cylinder. Since each end of the container 10 is provided with an identical end piece 12, either end can be employed as the top of the purifier and the latter will operate with identical efficiency.

The space within the cylinder 11 between the two end pieces 12 constitutes a purifying chamber 20. The purification of the water is accomplished by particles or grains of two dissimilar materials of opposite polarity intermixed with each other and occupying the purifying chamber 20. The two granular materials in the purifying chamber 20 are represented diagramatically in FIG. 1 wherein the square configurations 25 represent the positive poles of the plurality of galvanic cells, while the round configurations 30 represent the negative poles of these cells. Thus, the square configurations in the drawing represent particles of the material that constitute the positive poles while the round configuration represent particles of similar size that constitute the negative poles. Although square and round configurations are illustrated in the drawing it should be understood that this is for the purpose of representation only, and that in actual practice the configuration of the grains is not important and the negative and positive poles will in most instances be of similar irregular shape. It should be also understood that in the diagrammatic illustration of FIG. 1, the grains of material are shown spaced from each other for the sake of clarity but in actual practice they will not be spaced from each other and there will only be small voids between the grains through which the water will flow.

Although a variety of materials can be employed to form the positive and negative poles, a preferred embodiment is to provide grains of magnesium to form the positive poles 25 and grains of carbon preferably in the form of activated charcoal to form the negative poles 30.

One of the most popular materials for forming the negative pole of a galvanic cell is zinc, but this material has been determined to be objectionable in a water purifier of the present type inasmuch as it produces chemical compounds which may be harmful to humans if consumed for protracted periods of time. Zinc is ambivalent and therefore has a greater opportunity to combine with other elements into a variety of compounds that may be assimulated into the body when consumed. On the other hand, magnesium has been found to function very efficiently as the positive pole of a galvanic cell and is not ambivalent so it is not apt to combine with other elements to produce harmful compounds during the galvanic action.

Although activated charcoal has been mentioned as a preferred material, regular charcoal or other carbon will function with equal efficiency in producing electric current as part of the galvanic cell. However, activated charcoal has the added advantage of removing objectionable odors from the water to render it more palatable for human consumption. Regardless of whether regular charcoal or activated charcoal is employed for this purpose each will be equally effective in producing the germicidal action for destroying harmful bacteria.

The size of the grains of material 25 and 30 is not critical and it has been found that if these grains are of a size that will pass through a 40 to 60 mesh screen and the amount of the two materials are equally divided, an excellent germicidal action will occur for purifying the water that passes through the mixture.

In operation, the polluted water will be poured onto the top end piece 12 and flow through the perforations 13 into the purifying chamber 20 where it will contact the many grains 25 and 30. The polluted water then serves as an electrolyte for what in effect constitute a plurality of galvanic cells formed by the many positive and negative poles resulting from the grains of dissimilar galvanic battery materials.

The proximity of the positive poles to the negative poles in the purifying chamber 20 produces a relatively high voltage gradient, and the many different cells throughout the purifying chamber 20 results in the current that is produced being distributed substantially equally through the water flowing in the purifying chamber. In addition, an exceptionally high surface exposure of the electrode elements is obtained to produce the most nascent chlorine and oxygen which is liberated at the electrode surfaces that are distributed throughout the purifying chamber 20. The nascent gases thus produced are effectively distributed throughout the water in the purifying chamber and they operate by themselves and in combination to destroy the bacteria in the polluted water. As a result, the water which flows through the purifying chamber 20 and out through the perforations 13 in the bottom end piece 12 is thoroughly sterilized so that it may be consumed by humans with no harmful consequences.

The alternate embodiment of the present invention illustrated in FIG. 2 operates to purify the water in the same manner but the positive poles are not in granular form but rather in the form of perforated plates. Thus, this embodiment comprises a cylinder 35 having a top end piece 36 and a bottom end piece 37. The top end piece 36 is provided with perforations or apertures 38 to admit water into the cylinder 35. In like manner the bottom end piece 37 is provided with perforations 39 for admitting the flow of purified water out of the cylinder 35. The top end piece 36 is illustrated as being disposed within the cylinder 35 and fastened therein by spot welds 40 with its upper edge flush with the upper edge of the cylinder 35. Similarly, the bottom end piece 37 is disposed within the interior of the cylinder 35 with its bottom edge flush with the bottom edge of the cylinder 35. The bottom end piece 37 is secured in position relative to the cylinder 35 by spot welds 41. The space within the cylinder 35 between the end pieces 36 and 37 constitutes a purifying chamber 42 within which the purifying action occurs on the water passing therethrough.

The embodiment illustrated in FIGURE 2 differs from the previously described embodiment by reason of the fact that the positive poles of the galvanic cells in the purifying chamber 42 are not in granular form but rather in the form of plates 45 with each plate having a plurality of perforations 46. The plates 45 are spaced from each other within the purifying chamber 42 and the space between the several plates 45 is filled with particles or grains 50 of the element forming the negative poles of the galvanic cells. The spacing of the plates 45 is achieved by means of annular flanges 51 depending from each of the plates 45 so that the bottom edge of each of the annular flanges 51 rests upon the top surface of the plate 45 beneath it. Accordingly, the several plates 45 are spaced from each other by their associated flanges throughout the height of the purifying chamber 42.

The plates 45 constitute the positive poles of the galvanic cells as previously mentioned and to this end, they are preferably formed of magnesium to provide a material which serves very efficiently as the positive pole of a galvanic cell and yet does not produce the objectionable compounds that may be formed by zinc or other elements. The grains 50 forming the negative poles of the galvanic cells are preferably formed of carbon and if it is desired to remove odors from the water that is being sterilized, activated charcoal is most suitable for this purpose. As mentioned in the description of the first embodiment, the germicidal action will take place with equal effectiveness regardless of whether the grains 50 are formed to activated charcoal or regular charcoal. The grains 50 are illustrated as being of circular configuration in FIGURE 2 but this is done for convenience in illustration and in actual practice they will be of irregular shapes.

In operation, the water that is to be purified is poured into the dished top plate 36 and the polluted water will flow through the apertures 36 into the purifying chamber 42. It will pass through the grains of carbon 50 which are preferably charcoal and into perforations or apertures 46 that are formed in the several plates 45. The water in the purifying chamber 42 will simultaneously contact the plates 45 and the particles 50 to serve as an electrolyte for the galvanic cell. Each of the plates 45 is provided with a multitude of perforations 46 so that the liquid being purified is free to flow through the cylinder 35 coming into contact with both the magnesium plates 45 forming the positive pole of galvanic cells as well as with the grains of carbon 50 that form the negative poles of the galvanic cells. The electrical current produced by such galvanic cells is distributed throughout the water in the purifying chamber 42 and operates in the manner previously described for the first embodiment to produce a germicidal action which effectively sterilizes the water. Such action continues on the water until it flows out of the cylinder 35 through the apertures 39 in the bottom end piece 37. Of course, in addition to the germicidal action by the electric current that is generated, the water is filtered by reason of its passage through the particles of charcoal 50 and if the latter is formed of activated charcoal objectionable odors will also be removed from the water to render it more palatable for human consumption.

The second embodiment of the invention illustrated in FIGURE 2 is particularly well adapted for large purifiers to avoid putting excess weight on the grains of charcoal which would tend to crush it and reduce it to powder form. In the embodiment of FIGURE 2, the grains of charcoal 50 at the bottom of the cylinder 35 do not carry the weight of all the granular material above it but rather, the weight is distributed evenly amongest the several plates 45. Accordingly, a movement of the apparaus will not tend to produce a crushing action on the charcoal grains 50.

From the foregoing detailed description of the structure and operation of the illustrative embodiments of the present invention, it will be apparent that a new and improved water purifier has been provided which sterilizes water by electrolysis to render it fit for human consumption. The purifier is adapted to generate an electrical current by galvanic action with the electric current serving to produce the germicidal action which sterilizes the water. A unique arrangement of positive and negative poles of the galvanic cells is obtained to produce a maximum amount of electrical current for effecting the sterilizing action in a minimum amount of space for optimum operating efficiency.

Although the illustrative embodiment of the present invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structures, I hereby claim as my invention:

1. In a water purifying apparatus having a purifying chamber for receiving the water to be purified;
    a first material in the purifying chamber constituting a first electrode of a galvanic cell; and
    a second material in the purifying chamber constiuting the second electrode of the galvanic cell, said second material being of a polarity opposite to the polarity of said first electrode, one of said materials being in the form of a plurality of perforated plates, having downwardly extending flanges disposed in the purifying chamber in stacked relationship and said second material being in the form of particles sandwiched between said plates, so that water in the purifying chamber will simultaneously contact both materials to serve as an electrolyte for the galvanic cell which will produce an electrical current that is substantially evenly distributed throughout the water in the purifying chamber to produce a germicidal action for destroying bacteria in the water.

2. A water purifying apparatus according to claim 1 wherein said perforated plates are magnesium constituting the positive pole of the galvanic cell and said particles are carbon which constitute the negative pole of the galvanic cell.

References Cited

UNITED STATES PATENTS

| | | | |
|---|---|---|---|
| 614,617 | 11/1898 | Milligan | 204—150 |
| 1,022,365 | 4/1912 | Haythorpe | 204—249 |
| 1,499,600 | 7/1924 | Smith | 204—249 |
| 2,685,565 | 8/1954 | Jones et al. | 204—249 X |

FOREIGN PATENTS

| | | |
|---|---|---|
| 246,570 | 1/1926 | Great Britain |

OTHER REFERENCES

Behrman, A. S. and Gustafson, H.: "Behavior of Oxidizing Agents With Activated Carbon," Industrial and Engr. Chemistry, vol. 27, p. 426, April 1935.

JOHN H. MACK, *Primary Examiner.*

HOWARD S. WILLIAMS, *Examiner.*

D. R. VALENTINE, *Assistant Examiner.*